Nov. 10, 1953  J. F. CLAYTON  2,659,019
PULSE GENERATOR

Filed Nov. 5, 1951  2 Sheets-Sheet 1

INVENTOR.
JOSEPH F. CLAYTON
BY
Ellsworth R. Roston
ATTORNEY

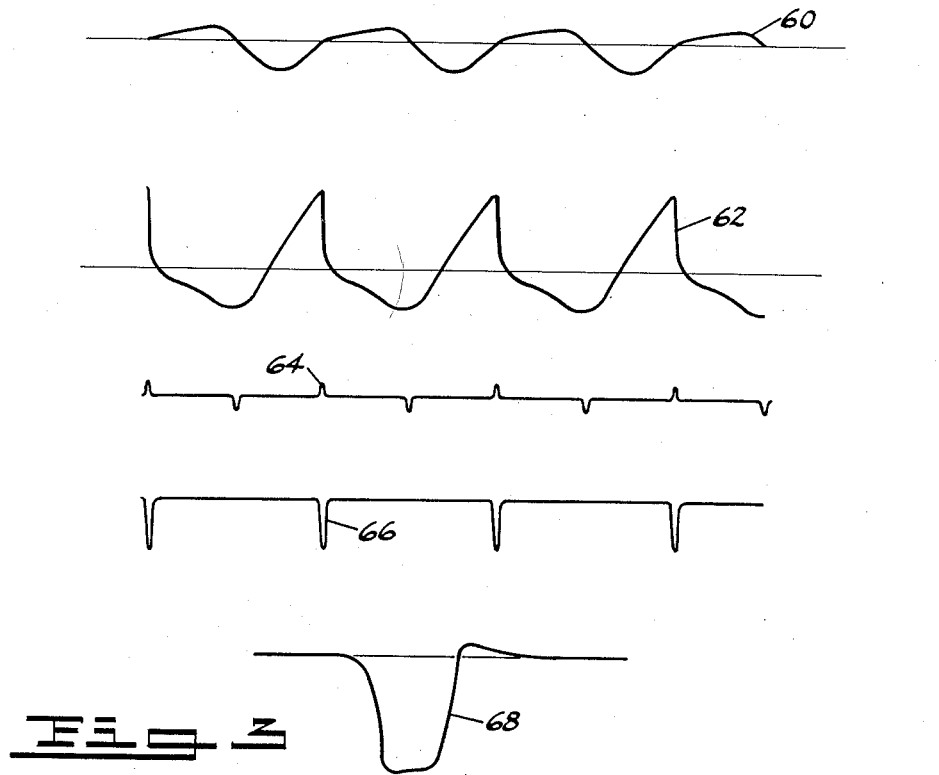
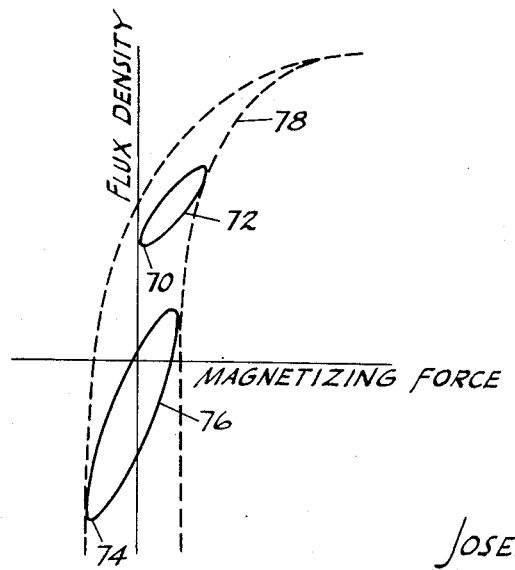
Fig. 3
Fig. 4
INVENTOR.
JOSEPH F. CLAYTON
BY
Ellsworth R. Roston
ATTORNEY Patented Nov. 10, 1953

2,659,019

UNITED STATES PATENT OFFICE 2,659,019

PULSE GENERATOR

Joseph F. Clayton, Detroit, Mich., assignor to Bendix Aviation Corporation, Detroit, Mich., a corporation of Delaware Application November 5, 1951, Serial No. 254,901

15 Claims. (Cl. 307—108)

This invention relates to a pulse generator and more particularly to a pulse generator operative at a predetermined instant in each cycle of alternating voltage to produce a pulse having a maximum amount of power and stability.

In co-pending application Serial No. 143,140, filed February 8, 1950, by Stanley J. Krulikoski et al., a circuit is disclosed for charging a pulse forming network to a maximum value during each cycle of alternating voltage and for discharging the network through a pulse transformer when the network has been charged to a maximum value. The discharge of the network is controlled by a normally non-conducting gas-filled tube connected to the network and to the pulse transformer, the tube being triggered into conduction when the charging current flowing through the network is substantially zero. Since the network is charged to substantially a maximum value when the current through it is substantially zero, a pulse of considerable energy is produced across the pulse transformer upon the discharge of the network.

One of the factors limiting the size of the pulses formed in the pulse transformer is the residual magnetism which is produced in the core of the transformer by the train of unidirectional pulses produced across the transformer. Since the residual magnetism has the same polarity as the magnetism produced by each of the current pulses passing through the pulse transformer, it tends to reduce the range of flux produced by each current pulse. The reduced range through which the flux travels in turn limits the amplitude of each voltage pulse induced in the secondary winding of the pulse transformer.

This invention provides a pulse generator in which the pulse transformer is magnetically coupled in a predetermined manner to a transformer for charging the pulse forming network during the periods between pulses. By such a coupling, the core of the pulse transformer is polarized by the charging current in a direction opposite to the polarization produced by the discharge current from the network. The polarizing action during the charging cycle not only eliminates the residual magnetism but actually causes the core to be oppositely polarized. In this way, a considerably increased magnetic flux is produced in the core by the discharge current flowing through the transformer, and a considerably increased voltage is induced in the secondary of the transformer.

The magnetic coupling between the pulse and charging transformers not only has a beneficial effect during the discharge pulse but also has a beneficial effect during the period between pulses. This results from the fact that the magnetic coupling causes a flux leakage path to be provided through the core of the pulse transformer during each charging cycle for some of the flux produced by the charging transformer. Since the value of this leakage flux may be controlled so as to be substantially resonant with the network capacitance at the charging frequency any necessity in pulse generators now in use for a physically separate inductor to produce such resonance is eliminated. In addition to producing beneficial effects during both the charging and discharge periods, the magnetic coupling also produces a material reduction in the space occupied by the pulse generator.

An object of this invention is to provide a pulse generator for producing pulses having a greater peak amplitude and energy than pulses produced by generators now in use.

Another object of the invention is to provide a pulse generator of the above character for producing a pulse in each cycle of applied alternating voltage at an optimum instant in the cycle, even though the frequency of the alternating voltage may vary.

A further object is to provide a pulse generator of the above character for producing a negative magnetic polarization in the core of a pulse transformer between pulses, so that discharge pulses of increased amplitude will be produced across the pulse transformer.

Still another object is to provide a pulse generator of the above character employing a predetermined magnetic coupling between the charging transformer and the pulse transformer to produce a leakage reactance resonant with the network at the charging frequency.

A still further object is to provide a pulse generator of the above character so constructed as to be compact and occupy a minimum amount of space at the same time that it gives an improved performance over generators now in use.

Other objects and advantages will be apparent from a detailed description of the invention and from the appended drawings and claims.

Figure 2:
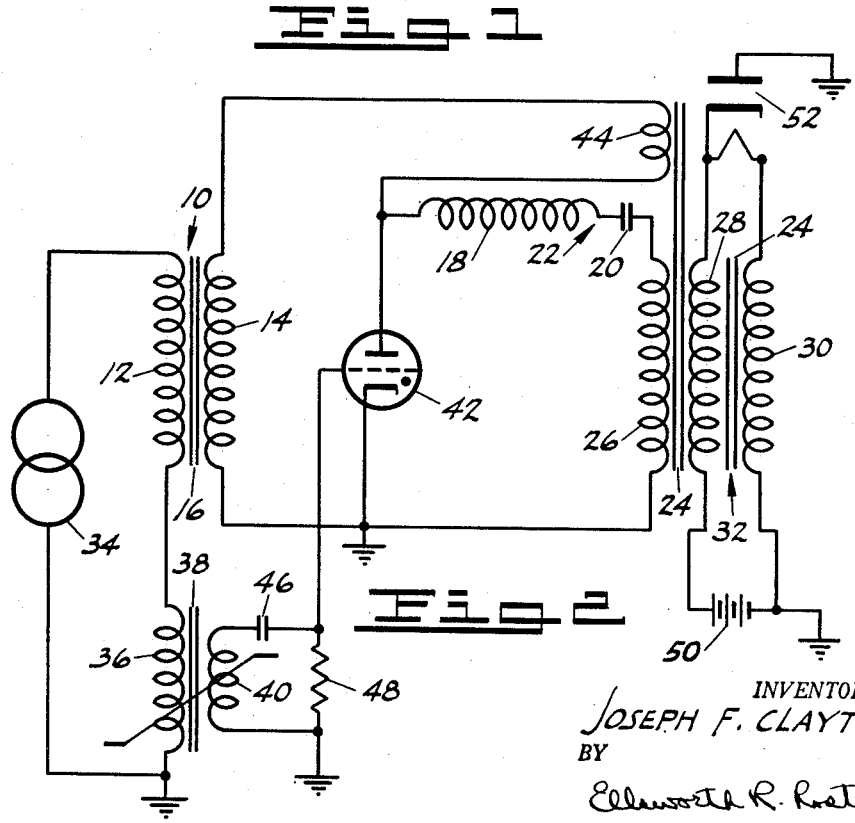
Figure 2 is a circuit diagram of one embodiment of the invention, including the components shown in Figure 1.

Figure 3 illustrates wave shapes of the voltages at some of the important terminals in the circuit shown in Figure 2 and wave shapes of the current flowing through some of the important components; and Figure 4 shows a pair of curves illustrating the improvement in the magnetic performance of the pulse transformer used in this invention as compared to the magnetic performance of the pulse transformer used in previous generators.

In one embodiment of the invention, a charging transformer, generally indicated at 10, having a primary winding 12 and a secondary winding 14 is provided. The primary winding 12 and secondary winding 14 are wound on opposite legs of a magnetic core 16 constructed to operate efficiently at a predetermined frequency, such as 4,000 cycles per second. A coil 18 and capacitance 20 are wound on the same leg of the core 16 as the secondary winding 14 of the transformer 10 and are connected in series to form a single-section pulse forming network, generally indicated at 22, having a capactive reactance at the predetermined frequency. Instead of one coil 18 and one capacitance 20, a plurality of coils and capacitances may be used to form a pulse forming network having a capacitive reactance similar to that of the single-section network.

Figure 1:
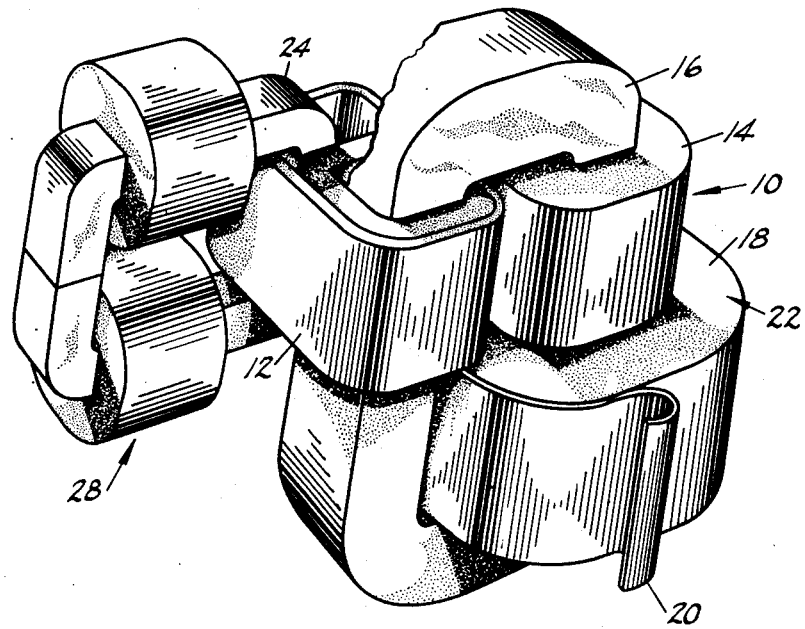
Figure 1 is a perspective view illustrating some of the important components which constitute one embodiment of the invention.

Part of the primary winding 12 is also wound on one leg of a second core 24 constructed to efficiently transfer a maximum amount of pulse energy from the pulse forming network to a load, such as a magnetron, hereinafter to be described. Windings are provided on each of the legs perpendicular to the leg linking part of the primary winding 12 to form a primary winding 26 (Figure 2) and a pair of secondary windings 28 and 30. The primary winding 26 and secondary windings 28 and 30 comprise a pulse transformer, generally indicated at 32 in Figures 1 and 2.

The charging transformer 10 and the pulse transformer 32 are connected in the circuit shown in Figure 2. The primary winding 12 of the transformer 10 is connected in series with a suitable power source 34 and with the grounded primary winding 36 of a saturable transformer 38 having a secondary winding 40. The power source 34 is adapted to supply an alternating voltage having the predetermined frequency, such as 4000 cycles per second.

The secondary winding 14 of the transformer 10 is connected between the plate and the grounded cathode of a gas-filled tube, such as a hydrogen thyratron tube 42. (An inductance 44 is shown connected in Figure 2 between the winding 14 and the plate of the tube 42. However, this inductance merely indicates schematically the magnetic leakage between the primary winding 12 and the secondary winding 14 resulting largely from the leakage between the core 24 and some of the primary turns.) The grid of the tube 42 is connected to the common terminal between a capacitance 46 and a resistance 48, which are in series with the secondary winding 40 of the transformer 38. The common terminal between the winding 40 and the resistance 48 is grounded.

The plate and the cathode of the thyratron 42 are also in series with the network 22 and the primary winding 26 of the pulse transformer 32. The secondary windings 28 and 30 of the transformer are in series with a suitable power supply, such as a battery 50, the negative terminal of which is grounded, and with the filament of a power tube, such as a magnetron 52. The cathode of the magnetron 52, somewhat schematically shown in Figure 2, is connected to the filament, and the anode of the magnetron is grounded.

In operation, current flows from the power source 34 through the primary windings of the transformers 10 and 38 and induces a voltage in the secondary winding 14 of the transformer 10. The induced voltage in turn produces a current through a circuit which includes the secondary winding 14, the pulse forming network 22 and the primary winding 26 of the pulse transformer. This current charges the network 22.

The secondary winding 14, pulse forming network 22 and primary winding 26 form a circuit resonant at the frequency of the voltage from the source 34. At this frequency, the reactance provided by the pulse transformer 32 is relatively small compared to the leakage reactance 44 provided by the transformer 10, so that the capacitive reactance of the network 22 is effectively in series resonance with the leakage reactance. This resonance causes the network to be charged during each cycle of alternating voltage to a value much higher than the applied voltage.

Because of the capacitive reactance of the network 22 at the frequency of the applied voltage, the current through the winding 14, illustrated at 60 in Figure 3, leads the voltage on the network by approximately 90°, this voltage being illustrated at 62 in Figure 3. This causes the current through the network to be approximately zero when the voltage on the network is at a maximum.

At approximately zero current, the rate of change of current through the primary winding 36 of the saturable transformer 38 is at a peak if the wave form of the current is considered to approach a sine wave. In other words, $di/dt$=maximum when $i=0$, where $i$ represents the current through the primary winding and $di/dt$ represents the rate of change of current. Furthermore, at approximately zero current, the inductance of the primary winding 36 is at a peak, since the core of the transformer 38 becomes saturated as the current through the winding 36 increases.

Since L and $di/dt$ have their peak values for the winding 36 at substantially the time that $i=0$, a pulse is induced in the secondary winding 40 when the current in the primary winding passes substantially through zero. Each of the voltage pulses induced in the winding 40 is illustrated at 64 in Figure 3. Because of the fact that the trigger pulses are formed when the current through the winding 36 is substantially zero, the positive pulses so formed correspond in time with the peak voltage on the network 22.

When each positive trigger pulse is formed in the winding 40, it introduces a positive voltage through the capacitance 46 to the grid of the normally non-conductive tube 42 and causes the tube to start conducting. Upon the conduction of the tube 42, the network 22 discharges through a circuit which includes the network, the tube 42 and the primary winding 26 of the pulse transformer 32. Because of the low impedance presented by the circuit, the discharge takes place in a short and heavy pulse, as illustrated at 66 in Figure 3. The resultant voltage induced in the secondary windings 28 and 30 of the transformer 32 causes the power tube 52 to produce signals for transmission or any other utilization. One of the pulses on the secondary windings of the transformer 32 is enlarged as at 68 to illustrate its wave shape more clearly.

The pulse generator disclosed above has several important advantages. Since the trigger pulse 64 is produced when substantially no current flows through the winding 40, the formation of the pulse is independent of the frequency or phase of the voltage from the source 34. Furthermore, since the peak charge on the network 22 occurs at substantially the time that the current through the winding 40 is zero, it too occurs independently of any variations in the frequency of the voltage from the source 34. This causes each output pulse 66 to be formed at the optimum instant in each cycle of alternating voltage even though changes may occur in the frequency at which the network 22 is charged.

Thus, no external triggering signal is required to insure a stable and optimum operation of the pulse generator under all the conditions that may be encountered. Instead, the pulse generator operates internally in a synchronous manner to produce output pulses having a peak power and a stable and desirable wave shape under widely varying conditions. For example, strong and desirable pulses are produced with a frequency variation of as much as 20% in either direction from the predetermined frequency.

By coupling the primary winding 12 to both the core 16 and the core 24, part of the flux produced by the charging current which flows through the winding threads the core 24. Because of its failure to link the secondary winding 14, the flux threading the core 24 largely constitutes the leakage flux 44. This leakage is important in producing a circuit through the network 22 resonant at the frequency of the voltage from the source 34. Since the inductance of the transformer 32 is relatively small at the charging frequency, the leakage inductance 44 in effect constitutes the inductance which is resonant at the charging frequency with the capacitive reactance provided by the network 22. Thus, the magnetic coupling between the transformers 10 and 32 eliminates any necessity for providing an extra coil to make the charging circuit resonant at the frequency of the voltage from the source 34.

The magnetic coupling between the transformers 10 and 32 also serves to eliminate any residual magnetic flux which remains in the core 24 after a discharge pulse flows through the transformer 32. This residual flux, illustrated at 70 in Figure 4, is formed because the flux remains at a positive value after it has travelled through a hysteresis loop, illustrated at 72, resulting from the discharge current which flows through the pulse transformer 32. As may be seen in Figure 4, the residual flux causes the cores of the pulse transformers in previous generators to become easily saturated, so that the increase in flux during the current pulse is somewhat limited. Since the increase in flux during the current pulse controls the amplitude of the voltage pulse induced in the secondary windings of the pulse transformer used in previous generators, only a voltage pulse of limited peak amplitude can be obtained in these generators.

Because of the magnetic coupling between the transformer 10 and the core 24 in the pulse generator constituting this invention, the charging current flowing through the charging transformer between discharge pulses produces a flux in the core 24 in a direction opposite to that produced by the discharge current which flows through the transformer 32 and the tube 42. This leakage flux not only eliminates the residual flux 70 but actually creates a magnetic flux having a negative polarity compared to the residual flux 70, as illustrated at 74 in Figure 4. Thus, upon each discharge of the network 22, a considerably greater range of flux is produced for a predetermined amount of material in the core 24, as the network discharges through the pulse transformer. The increased flux is illustrated by the hysteresis loop indicated at 76 in Figure 4. The relative positions of the hysteresis loops 72 and 76 may be shown by comparison with a hysteresis loop 78 formed at low frequencies and illustrated by broken lines in Figure 4. An increased flux is produced in the hysteresis loop 76 over that produced in the loop 72 since the flux in the loop 76 is passing through its maximum response region and has no opportunity to become saturated. This causes a voltage pulse of considerably increased amplitude to be induced in the secondary windings of the transformer 32 over that produced by previous pulse generators using the same amount of core material in the pulse transformer and having the same amount of energy in the network 22.

By coupling the transformers 10 and 32 and placing them in one container, a considerable savings in space is also effectuated. In addition, the weight of the pulse generator is considerably reduced, especially if only one container instead of two has to be potted with a suitable material to protect the transformers from high voltages and to conduct outwardly the heat generated in the transformer core and windings. This reduction in space and weight is important in both commercial and military applications.

Although this invention has been disclosed and illustrated with reference to particular application, the principles involved are susceptible of numerous other applications which will be apparent to persons skilled in the art. The invention is, therefore, to be limited only as indicated by the scope of the appended claims.

What is claimed is:

1. A pulse generator, including, a source of alternating voltage, first magnetic means connected to the voltage source, a switch connected across the first magnetic means, a pulse forming network, a pulse transformer magnetically coupled to the first magnetic means, means, including the pulse forming network and the pulse transformer, connected to the first magnetic means to provide a charging circuit resonant at the frequency of the voltage from the source, and means connected to the first magnetic means and operative upon the storage of a maximum amount of energy in the pulse forming network to close the switch for the discharge of the pulse forming network through the pulse transformer.

2. A pulse generator, including, a source of alternating voltage, an inductively reactive member connected to the voltage source, a pulse forming network adapted to be capacitively reactive at the frequency of the voltage from the source, a pulse transformer magnetically coupled to the inductively reactive member and having a winding connected to the reactive member and the pulse forming network to form a circuit resonant at substantially the frequency of the voltage from the source, a normally open switch connected to the pulse forming network and the pulse transformer and operative when closed to provide a discharge path for the network through the pulse transformer, and means operative to close the switch upon the storage of a maximum amount of energy in the network.

3. A pulse generator, including, a source of alternating voltage, an inductively reactive member connected to the voltage source, a saturable reactance connected to the voltage source to produce a triggering signal at a predetermined time in each cycle of alternating voltage, a pulse forming network, a pulse transformer loosely coupled magnetically to the inductively reactive member, the pulse forming network and the pulse transformer being connected to the inductively reactive member to produce a circuit resonant at substantially the frequency of the voltage from the source, and a switch operative upon the introduction of a triggering signal from the saturable reactance to provide a discharge path for the network through the pulse transformer.

4. A pulse generator, including, a source of alternating voltage, an inductively reactive member connected to the voltage source, a pulse forming network connected to the inductively reactive member and adapted to have a capacitive reactance substantially resonant with the inductively reactive member at the frequency of the voltage from the source, a normally open switch operative when closed to provide a discharge path for the pulse forming network, means operative to close the switch at a predetermined instant in each cycle of alternating voltage, and a pulse transformer connected to the inductively reactive member and to the network to receive the current for charging the network and connected to the pulse forming network and the switch to receive a discharge pulse from the network upon the closure of the switch, the pulse transformer having a core magnetically coupled to the inductively reactive member to receive a charging current in a direction opposite to the discharge current from the pulse forming network.

5. A pulse generator, including, a source of alternating voltage, an inductively reactive member connected to the source of alternating voltage, a pulse forming network connected to the inductively reactive member and adapted to have a capacitive reactance at the frequency of the voltage from the source, a normally open switch connected across the pulse forming network and operative when closed to provide a discharge path for the pulse forming network, means operative by the current for charging the network to close the switch at a predetermined time in each cycle of alternating voltage corresponding to the storage of a maximum amount of energy in the pulse forming network, and a pulse transformer connected to the pulse forming network and the switch to receive a discharge pulse from the network upon the closure of the switch, the pulse transformer being magnetically associated with the inductively reactive member to receive magnetization during the charging current relative to the magnetization provided by the discharge current, such that a discharge pulse of relatively great magnitude can flow through the pulse transformer before the transformer is magnetically saturated with a positive magnetization.

6. A pulse generator, including, a source of alternating voltage, a charging transformer having a primary winding and a secondary winding, the primary winding being connected to the source of alternating voltage, a pulse transformer magnetically coupled to the charging transformer to receive a charging current in a direction opposite to its output pulse, the pulse transformer having a primary winding and a secondary winding, a pulse forming network connected to the secondary winding of the charging transformer and the primary winding of the pulse transformer and adapted to be capacitively charged at the frequency of the voltage from the source, a gas-filled tube having a cathode, grid and plate, the plate and cathode of the tube being connected across the pulse forming network and the pulse transformer, and means connected to the grid of the tube to apply a positive pulse for the conduction of the tube upon the storage of a substantially maximum amount of energy in the network so as to provide a circuit for the discharge of the network through the pulse transformer.

7. A pulse generator, including, a source of alternating voltage, a charging transformer having a primary winding and a secondary winding, the primary winding being connected to the source of alternating voltage, a pulse forming network adapted to be capacitively charged at the frequency of the voltage from the source, a pulse transformer magnetically coupled to the charging transformer to receive the current from the charging transformer in a direction opposite to its output pulse, the pulse transformer having a primary winding and a secondary winding, the pulse forming network, the secondary winding of the charging transformer and the primary winding of the pulse transformer being connected together to form a circuit resonant at substantially the frequency of the voltage from the source, a gas-filled tube having a cathode, grid and plate, the plate and cathode of the tube being connected across the pulse forming network and the primary winding of the pulse transformer, and means connected to the grid of the tube to provide a positive pulse on the grid for the conduction of the tube upon the storage of a maximum amount of energy in the pulse forming network.

8. A pulse generator, including, a source of alternating voltage, a charging transformer, a pulse forming network, means, including the charging transformer and the network, connected to the voltage source to form a resonant charging circuit, means connected to the resonant circuit for forming a trigger pulse when the network has been charged to substantially a maximum value, an electrical switch connected to the resonant circuit to control the discharge of the network, the electrical switch being closed upon the formation of each trigger pulse, and a pulse transformer electrically connected to the network and the switch and magnetically coupled to the charging transformer to receive a negative magnetic polarization during the charging of the network relative to the magnetic polarization produced upon the discharge of the network, so as to produce a pulse of maximum energy upon the network discharge.

9. A pulse generator, including, a first magnetic core, a charging transformer having primary and secondary windings wound on the core, a second magnetic core, one of the windings of the charging transformer also having turns wound on the second core, a pulse transformer having primary and secondary windings wound on the second core, means for applying an alternating voltage to the charging transformer, means resonant with the charging transformer at the frequency of the alternating voltage to provide a storage of energy and connected to the primary winding of the pulse transformer to provide a subsequent discharge of the stored energy, and means operative upon the storage of a maximum amount of energy in the storage means to provide a discharge path for the storage means through the primary winding of the pulse transformer.

10. A pulse generator, including, a charging transformer having primary and secondary windings, first and second magnetic cores linked by the primary winding of the charging transformer, the first core also being linked by the secondary winding of the charging transformer, a pulse transformer having primary and secondary windings linked by the second core, means for providing on the primary winding of the charging transformer an alternating voltage having a predetermined frequency, means, including a pulse forming network, connected to the secondary winding of the charging transformer to form a circuit resonant substantially at the charging frequency, and a switch connected to the pulse forming network and the primary winding of the pulse transformer and operative to provide a path for the discharge of the pulse forming network when the network has been charged to a maximum value.

11. A pulse generator, including, a charging transformer having primary and secondary windings, first and second magnetic cores linked by the primary winding of the charging transformer, the first core also being linked by the secondary winding of the charging transformer, a pulse transformer having primary and secondary windings linked by the second core, means for providing on the primary winding of the charging transformer an alternating voltage having a predetermined frequency, a pulse forming network connected in series with the secondary winding of the charging transformer and the primary winding of the pulse transformer to form a charging circuit resonant at substantially the frequency of the alternating voltage, a normally non-conductive gas-filled tube having a cathode, grid and plate, the plate and cathode of the tube being connected across the pulse forming network and the primary winding of the pulse transformer, and means connected to the grid of the tube to trigger the tube into a state of conductivity upon a maximum charging of the pulse forming network so as to provide a path for the discharge of the network through the primary winding of the pulse transformer.

12. A pulse generator, including, a charging transformer having primary and secondary windings, first and second magnetic cores linked by the primary winding of the charging transformer, the first core also being linked by the secondary winding of the charging transformer, a pulse transformer having primary and secondary windings linked by the second core, a source of alternating voltage connected to the primary winding of the pulse transformer to provide a voltage having a predetermined frequency, a pulse forming network having a capacitive reactance at the frequency of the alternating voltage, the pulse forming network being connected in series with the secondary winding of the charging transformer and the primary winding of the pulse transformer to form a charging circuit resonant at substantially the frequency of the alternating voltage, a normally non-conductive gas-filled tube having a cathode, grid and plate, the plate and cathode of the tube being connected across the pulse forming network and the primary winding of the pulse transformer, and a saturable reactance connected in series with the voltage source and the primary winding of the charging transformer to produce a pulse at substantially zero current through the winding, the reactance being connected to the grid of the tube to trigger the tube into a state of conductivity so as to provide a discharge path for the network through the primary winding of the pulse transformer.

13. A pulse generator, including, a source of alternating voltage, a charging transformer having a primary winding and a secondary winding, the primary winding being connected to the voltage source, a pulse forming network adapted to be capacitively reactive at the frequency of the voltage from the source, a pulse transformer magnetically coupled to the primary winding of the charging transformer to produce a leakage between the primary and secondary windings of the charging transformer, the leakage being represented by an inductive reactance, the pulse forming network being connected to the pulse transformer and the secondary winding of the charging transformer to produce a resonance with the leakage reactance, a normally open switch operative when closed to provide a path for discharging the pulse forming network through the pulse transformer, and means connected to the primary winding of the charging transformer to produce a triggering pulse at substantially zero current through the winding and connected to the switch to close the switch upon the formation of each triggering pulse.

14. A pulse generator, including, a source of alternating voltage, a charging transformer having a primary winding and a secondary winding, a saturable reactance connected in series with the voltage source and the primary winding of the charging transformer to produce a triggering pulse at substantially zero current through the winding, a pulse transformer magnetically coupled to the primary winding of the charging transformer to produce a leakage between the primary and secondary windings of the charging transformer, the leakage being represented by an inductive reactance, the pulse forming network being connected in series with the pulse transformer and the secondary winding of the charging transformer to produce a resonance with the leakage reactance at substantially the frequency of the voltage from the source, and a normally open switch connected to the saturable reactance and operative when closed to provide a path for discharging the pulse forming network through the pulse transformer.

15. A pulse generator, including, a source of alternating voltage, a charging transformer having a primary winding and a secondary winding, a saturable reactance connected in series with the voltage source and the primary winding of the transformer to produce a pulse at substantially zero current through the winding, a pulse transformer having a primary winding and a secondary winding, the pulse transformer being magnetically coupled to the primary winding of the charging transformer to produce a leakage between the primary and secondary windings of the charging transformer, the leakage being represented by an inductive reactance, a pulse forming network adapted to be capacitively reactive at the frequency of the voltage from the source, the network being connected in series with the primary winding of the pulse transformer and the secondary winding of the charging transformer to produce a resonance with the leakage reactance at the frequency of the voltage from the source, and a normally non-conductive gas-filled tube having a cathode, grid and plate, the cathode and plate of the tube being connected across the pulse forming network and the primary winding of the pulse transformer, the grid of the tube being connected to the saturable reactance to provide a conductance of the tube upon the formation of the triggering pulse by the reactance so that the pulse forming network may discharge through the primary winding of the pulse transformer.

JOSEPH F. CLAYTON.

References Cited in the file of this patent
UNITED STATES PATENTS

| Number | Name | Date |
| --- | --- | --- |
| 2,233,045 | Bonner | Feb. 25, 1941 |
| 2,262,630 | Bahring | Nov. 11, 1941 |